(12) United States Patent
Lynch et al.

(10) Patent No.: US 11,445,001 B2
(45) Date of Patent: Sep. 13, 2022

(54) SYNCHRONIZATION OF A MEDIA CODEC BETWEEN NETWORK ELEMENTS OF A MEDIA COMMUNICATION SESSION (71) Applicant: Avaya Inc., Basking Ridge, NJ (US)

(72) Inventors: John Lynch, Belleville (CA); Paul Haig, Carrying Place (CA); Chris McArthur, Belleville (CA)

(73) Assignee: AVAYA INC., Basking Ridge, NJ (US)

( * ) Notice: Subject to any disclaimer, the term of this patent is extended or adjusted under 35 U.S.C. 154(b) by 507 days.

(21) Appl. No.: 15/284,094

(22) Filed: Oct. 3, 2016

(65) Prior Publication Data
US 2018/0097868 A1  Apr. 5, 2018

(51) Int. Cl.
*H04L 65/80* (2022.01)
*H04L 65/65* (2022.01)
*H04L 65/403* (2022.01)

(52) U.S. Cl.
CPC ........... *H04L 65/80* (2013.01); *H04L 65/65* (2022.05); *H04L 65/403* (2013.01)

(58) Field of Classification Search
USPC ...................................................... 370/503
See application file for complete search history.

(56) References Cited

U.S. PATENT DOCUMENTS

| | | | | |
|---|---|---|---|---|
| 6,006,253 A | * | 12/1999 | Kumar | H04N 7/152 348/E7.084 |
| 7,710,941 B2 | * | 5/2010 | Rietschel | H04J 3/0664 370/350 |
| 9,130,899 B1 | * | 9/2015 | Baird | G06F 16/95 |
| 2002/0061012 A1 | * | 5/2002 | Thi | H04B 3/23 370/352 |
| 2008/0208376 A1 | * | 8/2008 | Jung | G06F 1/3215 700/94 |
| 2010/0111113 A1 | * | 5/2010 | Wong | H04J 3/0664 370/503 |
| 2015/0052571 A1 | * | 2/2015 | Stokking | H04N 21/8547 725/116 |
| 2016/0330108 A1 | * | 11/2016 | Gillon | H04L 69/40 |
| 2016/0359925 A1 | * | 12/2016 | Song | H04L 65/1069 |
| 2017/0006078 A1 | * | 1/2017 | Leung | H04L 65/601 |
| 2017/0195769 A1 | * | 7/2017 | Chang | H04R 1/1016 |

* cited by examiner

*Primary Examiner* — Gregory B Sefcheck
*Assistant Examiner* — Majid Esmaeilian (57) ABSTRACT

Embodiments disclosed herein provide systems, methods, and computer readable media for synchronizing a media codec between network elements of a media communication session. In a particular embodiment, a method provides designating a first network element to be a static-clock network element during the media communication session and designating at least a second network element to be a dynamic-clock network element during the media communication session. The method further provides determining that a difference in clock speed exists between a second clock speed for the media codec at the second network element and a first clock speed for the media codec at the first network element. Also, the method provides adjusting the second clock speed to account for the difference in clock speed.

16 Claims, 6 Drawing Sheets

SYNCHRONIZATION OF A MEDIA CODEC BETWEEN NETWORK ELEMENTS OF A MEDIA COMMUNICATION SESSION

TECHNICAL FIELD

Aspects of the disclosure are related to media codecs used for media during a communication session and, in particular, to synchronizing clocks used by the media codecs to encode/decode the media.

TECHNICAL BACKGROUND

Real-time communication systems, such as voice and video communication systems, convert analog signals to digitally encoded signals using analog to digital converters (ADCs). An ADC at a transmitting end of a communication samples an analog signal at a fixed clock rate using a local oscillator to generate a corresponding digitized signal. The digital signal is typically included in a packet stream before the packet stream is sent to the receiving end of the communication. At the receiving end, a digital to analog converter (DAC) unpacks the packet stream and converts the digital signal back to analog form using a DAC that is clocked with a local oscillator at the receiver.

Problems may arise when the local oscillators at each end of the communication are not running at exactly the same speed. These problems include buffer overruns and underruns at the communication endpoints when receiving the packets for the media stream. Buffer overruns and underruns may result in jumps, pauses, or other anomalies when presenting the media to a user, which adversely effects the user experience during the communication session.

OVERVIEW

Embodiments disclosed herein provide systems, methods, and computer readable media for synchronizing a media codec between network elements of a media communication session. In a particular embodiment, a method provides designating a first network element to be a static-clock network element during the media communication session and designating at least a second network element to be a dynamic-clock network element during the media communication session. The method further provides determining that a difference in clock speed exists between a second clock speed for the media codec at the second network element and a first clock speed for the media codec at the first network element. Also, the method provides adjusting the second clock speed to account for the difference in clock speed.

In some embodiments, determining that the difference in clock speed exists comprises, at the second network element, receiving a plurality of data packets for the media communication session from the first network element, calculating an average frequency in which the plurality of data packets is received, and determining that a difference in frequency exists between the average frequency and a frequency of the first clock speed.

In some embodiments, calculating the average frequency comprises using the second clock speed to maintain a counter to calculate an arrival rate of the plurality of data packets.

In some embodiments, adjusting the second clock speed comprises increasing the second clock speed when the average frequency is determined to be lower than the frequency of the first clock speed and decreasing the second clock speed when the average frequency is determined to be higher than the frequency of the first clock speed.

In some embodiments, the plurality of data packets is received in the Real-time Transport Protocol (RTP).

In some embodiments, designating the first network element to be the static-clock network element comprises determining that the first clock speed comprises a most accurate clock speed relative to clock speeds of other network elements on the media communication session.

In some embodiments, the method provides at a time after designating the first network element to be the static-clock network element, determining that the first clock speed no longer comprises the most accurate clock speed, designating the first network element as a dynamic-clock network element, and designating another network element now having the most accurate clock speed to be the static-clock network element.

In some embodiments, the first network element comprises a first endpoint to the media communication session and the second network element comprises a second endpoint to the media communication session.

In some embodiments, the method further provides at the second network element, receiving a clock speed indication from the first network element indicating the first clock speed.

In some embodiments, the first clock speed comprises a default clock speed for the media codec.

In another embodiment, a network element is provided having one or more computer readable storage media and a processing system operatively coupled with the one or more computer readable storage media. Program instructions stored on the one or more computer readable storage media, when read and executed by the processing system, direct the processing system to designate a first network element to be a static-clock network element during the media communication session and designate at least a second network element to be a dynamic-clock network element during the media communication session. The program instructions further direct the processing system to determine that a difference in clock speed exists between a second clock speed for the media codec at the second network element and a first clock speed for the media codec at the first network element and adjust the second clock speed to account for the difference in clock speed.

In yet another embodiment, a network element is also provided having one or more computer readable storage media and a processing system operatively coupled with the one or more computer readable storage media. Program instructions stored on the one or more computer readable storage media, when read and executed by the processing system, direct the processing system to designate the network element to be a dynamic-clock network element during the media communication session, wherein a first network element is designated to be a static-clock network element during the media communication session. The program instructions further direct the processing system to determine that a difference in clock speed exists between a second clock speed for the media codec at the network element and a first clock speed for the media codec at the first network element and adjust the second clock speed to account for the difference in clock speed.

BRIEF DESCRIPTION OF THE DRAWINGS

Many aspects of the disclosure can be better understood with reference to the following drawings. While several implementations are described in connection with these

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
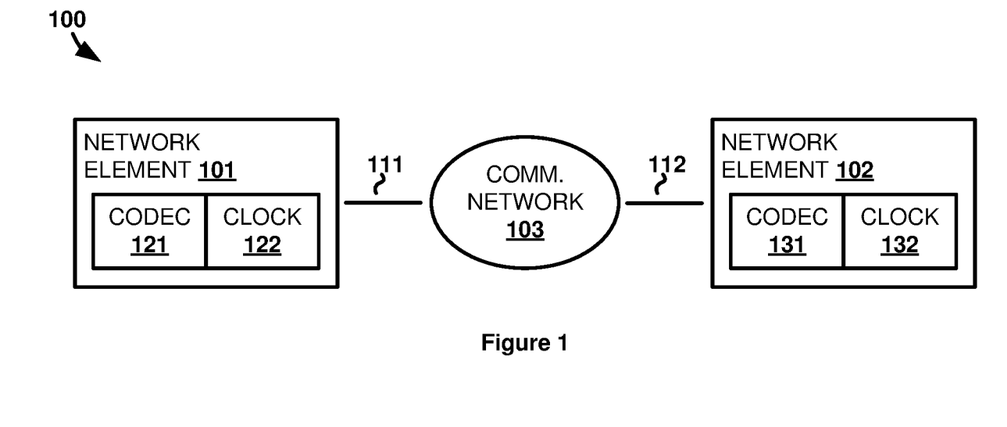
FIG. 1 illustrates a communication environment for synchronizing a media codec between network elements of a media communication session.

FIG. 1 illustrates communication environment 100 for synchronizing a media codec between network elements of a media communication session. Communication environment 100 includes network element 101, network element 102, and communication network 103. Network element 101 and communication network 103 communicate over communication link 111. Network element 102 and communication network 103 communicate over communication link 112.

In operation, network element 101 and network element 102 are two systems that encode and decode media for real-time media communication sessions. For example, network element 101 and network element 102 may be devices operated by users to exchange real-time user communications (e.g. voice and/or video captured of the user) over a media communication session. Alternatively, one or both of network element 101 and network element 102 may be some other type of system, such as a server for hosting media communication sessions, that may also encode/decode media during a media communication session.

Network element 101 uses codec 121 to encode and decode media for media communication sessions. Codec 121 uses clock 122 as network element 101's local oscillator for its analog/digital media conversions. Likewise, network element 102 uses codec 131 to encode and decode media for media communication sessions. Codec 131 uses clock 132 as network element 102's local oscillator for its analog/digital media conversions. Since clock 122 and clock 132 are independent of one another by virtue of being in separate network elements, it is possible that clock 122 and clock 132 may not be running at exactly the same rate even though both clocks are set to the same rate. A difference in clock speeds may cause buffer overrun/underrun issues at network element 101 and network element 102.

Figure 2:
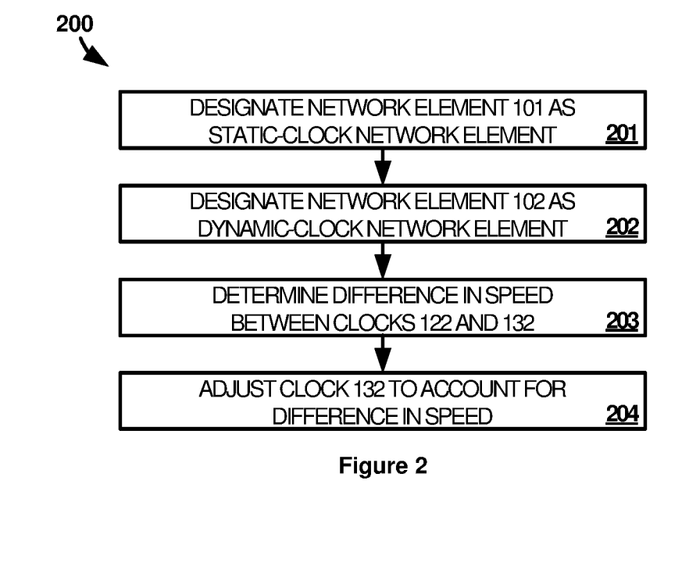
FIG. 2 illustrates a method of operating in the communication environment to synchronize a media codec between network elements of a media communication session.

FIG. 2 illustrates method 200 of operating in the communication environment to synchronize a media codec between network elements of a media communication session. Method 200 provides designating network element 101 to be a static-clock network element during a media communication session between at least network element 101 and network element 102 (201). The static-clock network element is designated as such because the speed of the static-clock network element's clock, clock 122 in this example, will not change as long as it is still designated as the static-clock network element. It should be understood that the term clock speed may be used throughout this description interchangeably with clock frequency or rate. As noted above, network element 101 and network element 102 may be endpoint user systems on the media communication session or may be some type of intermediate system, such as a communication server. One of either network element 101 or network element 102 may be the system that designates network element 101 as the static-clock network element or some other system, a network element on the communication session or otherwise, may be tasked with designating network element 101 as the static-clock network element. Network element 101 may be designated the static-clock network element based on clock 122 being more accurate than clock 132, based on random selection, based on timing of messaging used to establish the media communication session, based on clock 122 not having the ability to change its rate, or based on some other selection criteria—including combinations thereof. In some cases, designating a static-clock network element may not require notifying the static-clock network element because a static-clock network element will not operate in a different manner than it normally would when on the communication session.

Additionally, method 200 provides designating network element 102 to be a dynamic-clock network element during the media communication session (202). Unlike the clock of a static-clock network element, the clock of a dynamic-clock network element, clock 132 in this example, is able to change speeds in an effort to synchronize its speed with the clock in the static-clock network element. One of either network element 101 or network element 102 may be the system that designates network element 102 as the dynamic-clock network element or some other system, a network element on the communication session or otherwise, may be tasked with designating network element 101 as the static-clock network element.

Once network element 101 and network element 102 have been designated as static and dynamic network elements, respectively, method 200 provides determining that a difference in clock speed exists between the clock speed of clock 132 and the clock speed of clock 122 (203). The difference in clock speed may be determined at network element 102 based on the frequency of packets carrying the media for the media communication session being received at network element 102 from network element 101. The packets may be transferred in the real-time transport protocol (RTP) or may use some other protocol. Since clock 122 and clock 132 are set to the same frequency to allow codec 121 and codec 131 to properly encode/decode the media exchanged on the media communication session, network element 102 is aware of what frequency the packets should be received at (i.e. at the frequency provided by clock 132). If the frequency of the received packets differs from the frequency provided by clock 132, then clock 122 is running at a different speed than clock 132. Other methods of determining the existence of a clock speed differential may also be used.

Once the difference in clock speeds is determined to exist, method 200 provides adjusting the speed of clock 132 to account for the difference in clock speed (204). For example, if the speed of clock 132 is determined to be lower than that of clock 122, then network element 102 increases the speed of clock 132 to account for the difference. Similarly, if the speed of clock 132 is determined to be higher than that of clock 122, then network element 102 decreases the speed of clock 132 to account for the difference. The manner in which the speed of clock 132 is changed may depend on the type of clock. For example, clock 132 may be a voltage-controlled crystal oscillator (VCXO) whereby a change in the controlling voltage will change the speed. Alternatively, clock 132 may be derived from a higher oscillator and can be adjusted by changing the divide down counter. Other methods of changing the clock speed may also be used.

Advantageously, while clock 122 and clock 132 are supposed to be running at the same speed for codec 121 and codec 131 to properly encode/decode real-time media communications, method 200 ensures that the two clocks actually are running at substantially the same speed. For example, both clock 122 and clock 132 may be set to run at 100 kHz. Since clock 122 is in the static-clock network element, clock 122 is essentially assumed to be running at the correct speed. Even though clock 132 is also set to 100 kHz, it is possible that clock clock 132, being a local oscillator independent from clock 122, is actually running faster or slower than clock 122. For instance, clock 122 running at 100 kHz may actually be running at 103 kHz relative to clock 122's 100 kHz. Thus, method 200 identifies the 3 kHz discrepancy and adjusts clock 132 to match clock clock 122 by lowering clock clock 132's speed by 3 kHz relative to clock 122's speed.

Referring back to FIG. 1, network elements 101 and 102 each comprise a computer processor system and a communication interface. Network elements 101 and 102 may also include other components such as a user interface, router, server, data storage system, and power supply. Network elements 101 and 102 may each reside in a single device or may be distributed across multiple devices. Network elements 101 and 102 may be a telephone, computer, tablet, communication server, e-book, mobile Internet appliance, network interface card, media player, game console, application server, proxy server, or some other communication apparatus—including combinations thereof.

Communication network 103 comprises network elements that provide communications services to at least network element 101 and network element 102. Communication network 103 may comprise switches, wireless access nodes, Internet routers, network gateways, application servers, computer systems, communication links, or some other type of communication equipment—including combinations thereof. Communication network 103 may be a single network, such as a local area network, a wide area network, or the Internet, or may be a combination of multiple networks.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

Figure 3:
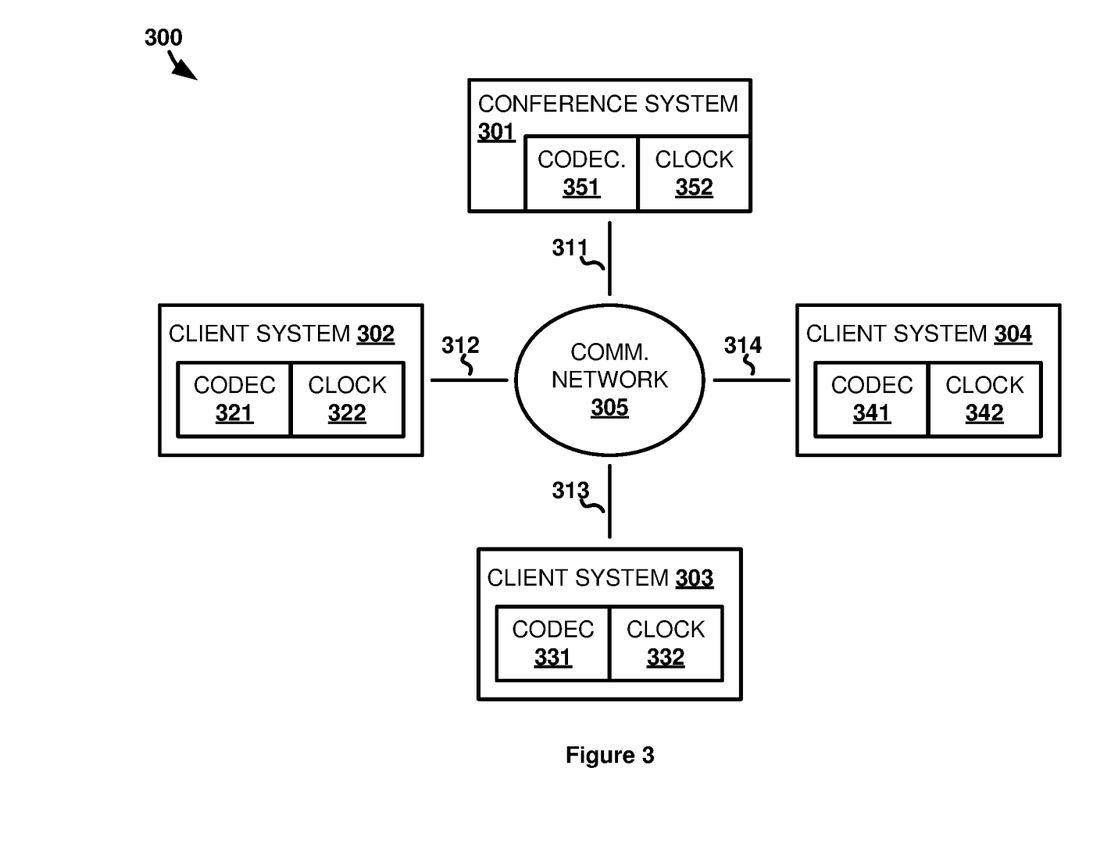
FIG. 3 illustrates another communication environment for synchronizing a media codec between network elements of a media communication session.

FIG. 3 illustrates communication environment 300 for synchronizing a media codec between network elements of a media communication session. Communication environment 300 includes conference system 301, client system 302, client system 303, client system 304, and communication network 305. Conference system 301 and communication network 305 communicate over communication link 311. Client system 302 and communication network 305 communicate over communication link 312. Client system 303 and communication network 305 communicate over communication link 313. Client system 304 and communication network 305 communicate over communication link 314.

In operation, conference system 301 provides multi-party conferencing services to various client systems. Each of systems 301-304 is an example of the network elements described above. The conferencing services may include real-time media communication services using voice, video, or other type of media. Each of systems 301-304 include a respective codec 321-351 and a respective clock 322-352 to regulate the ADCs of the codecs. Each codec may be configured for encoding/decoding multiple types of media or may be dedicated to a single type of media. As such, each system may include multiple codecs for use on a communication session and those codecs may use the same clock or a different clock than the one illustrated for each system. If additional clocks exist, then those clocks may be synchronized in the same manner as the clocks illustrated and discussed below.

Figure 4:
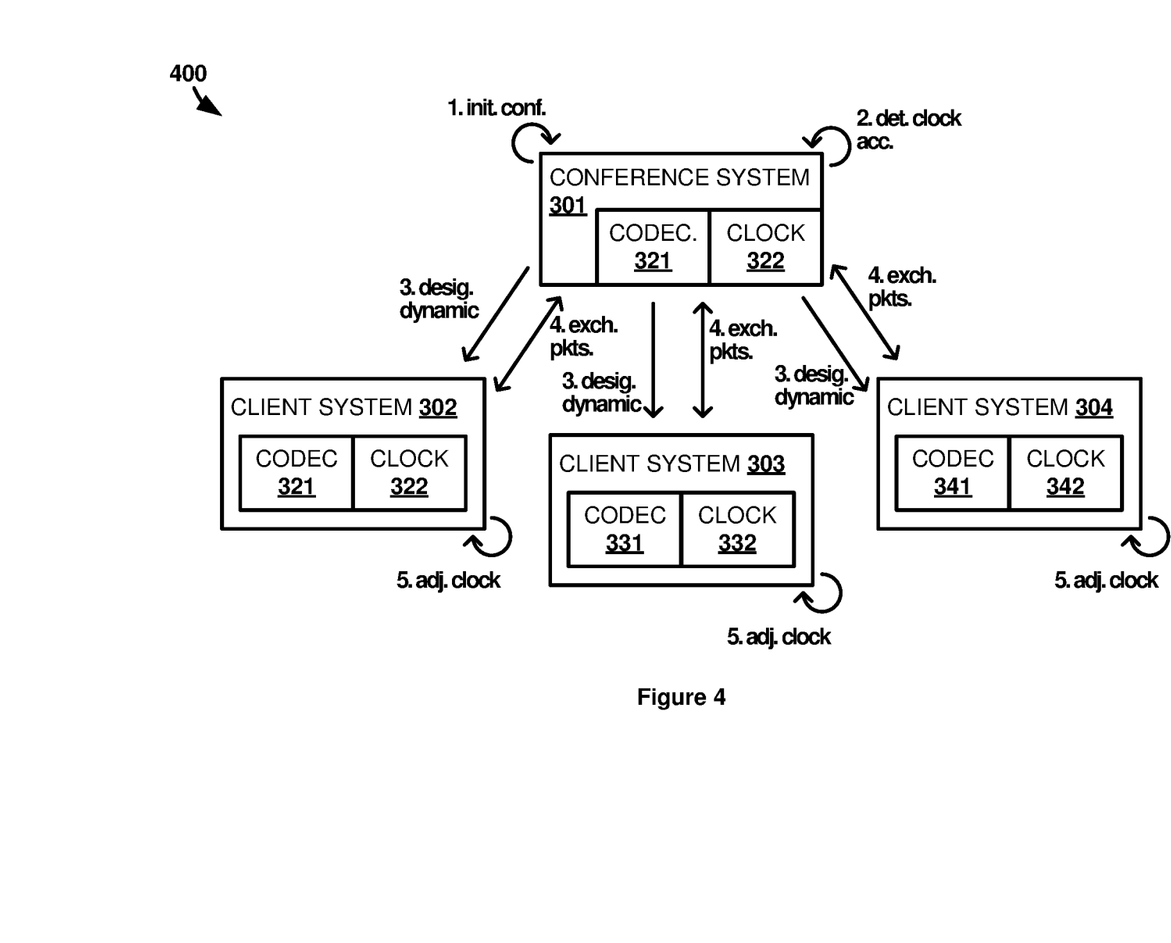
FIG. 4 illustrates a scenario of operating in the other communication environment to synchronize a media codec between network elements of a media communication session.

FIG. 4 illustrates scenario 400 of operating in communication environment 300 to synchronize a media codec between network elements of a media communication session. At step 1, a real-time conference session is initiated by conference system 301 between client system 302, client system 303, and client system 304. Once conference system 301, client system 302, client system 303, and client system 304 have been identified as network elements on the communication session, conference system 301 determines clock accuracies for each network element at step 2. Step 2 may occur before or after media begins to be exchanged in packets between the network elements for the communication session. In this example, the clock accuracies are determined for conference system 301 to select which network element will be the static-clock network element for this communication session. Specifically, conference system 301 may select the most accurate clock or, if there is a tie for most accurate clock, conference system 301 may introduce tie-breaker (e.g. the clock of the network element that first exchanged a message with conference system 301) or may simply select one of the most accurate clocks at random. Conference system 301 may determine the clock accuracies by receiving information from each of client system 302, client system 303, and client system 304 indicating the type of clock used by each respective system. For example, a clock that is synchronized with a stratum server may be considered more accurate than a clock that is free-running. Likewise, the accuracy of a stratum synchronized clock may depend on the strata level of the stratum server used to synchronize the clock (e.g. stratum 0 clocks are most accurate with decreasing accuracy as the stratum number increases).

In this example, conference system 301 determines that its own clock 322 is most accurate and conference system 301 itself should therefore be the static-clock network element. Conference system 301 therefore designates itself as the static-clock network element and, at step 3, transfers a message to client system 302, client system 303, and client system 304 indicating that each of those systems will be dynamic-clock network elements. In some examples, the dynamic-clock network elements may be informed of the static-clock network element's clock speed, otherwise, the dynamic-clock network elements may use a default clock speed, such as the default clock speed for use with codecs 321-351. Packets exchanged at step 4 to carry media for the communication session are then used by the dynamic-clock network elements to determine whether and how much their respective clocks should be adjusted at step 5. Specifically, client system 302, client system 303, and client system 304 may use method 600, described below, to determine how much their respective clocks need to be adjusted to synchronize with clock 322 of conference system 301.

Figure 5:
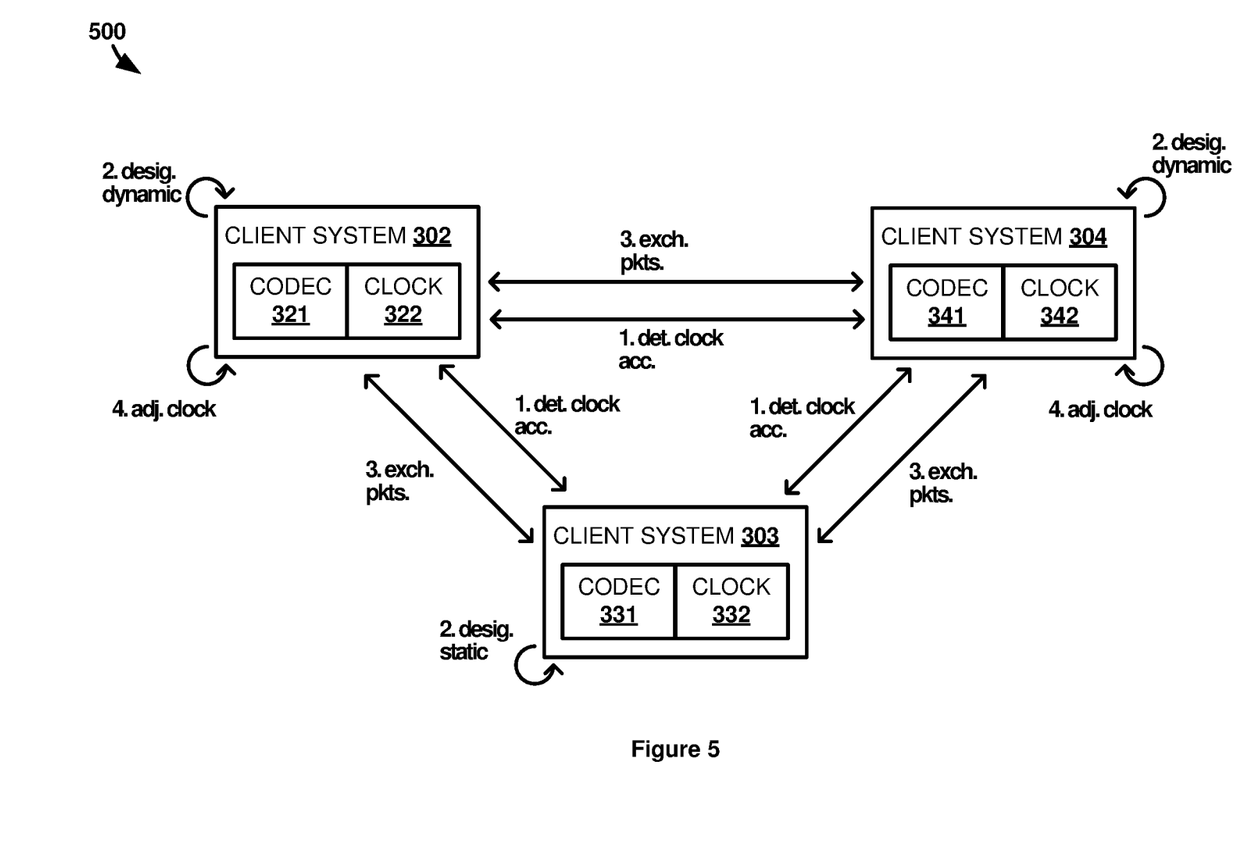
FIG. 5 illustrates another scenario of operating in the other communication environment to synchronize a media codec between network elements of a media communication session.

FIG. 5 illustrates scenario 500 of operating in communication environment 300 to synchronize a media codec between network elements of a media communication session. In this example, client system 302, client system 303, and client system 304 communicate with each other directly on a peer-to-peer basis rather than through conference system 301. As such, client system 302, client system 303, and client system 304 determine each other's clock accuracy by exchanging information among themselves at step 1. In this example, the client systems determine that client system 303 should be the static-clock client system in a similar manner to the determination of conference system 301 in scenario 500. Accordingly, at step 2, client system 303 is designated the static-clock network element and client system 302 and client system 304 are designated dynamic-clock network elements.

Packets exchanged at step 3 to carry media for the communication session are then used by the dynamic-clock network elements to determine whether and how much their respective clocks should be adjusted at step 4. Specifically, client system 302 and client system 304 may use method 600, described below, to determine how much their respective clocks need to be adjusted to synchronize with clock 322 of conference system 301.

Figure 6:
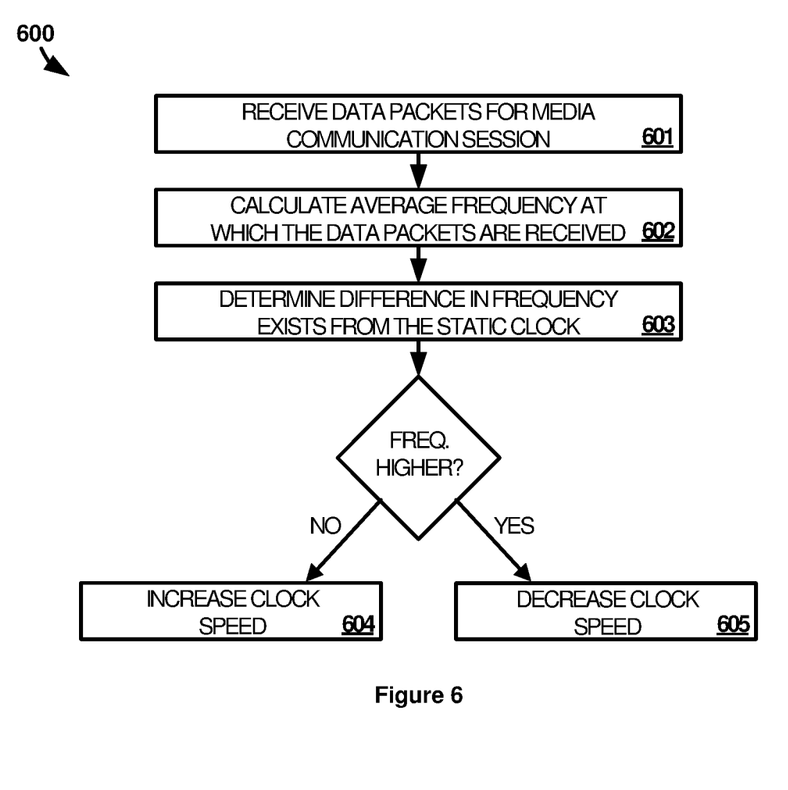
FIG. 6 illustrates a method of operating in the other communication environment to synchronize a media codec between network elements of a media communication session.

FIG. 6 illustrates method 600 of operating in the other communication environment to synchronize a media codec between network elements of a media communication session. Method 600 is an example of how any of the static-clock network elements described above may adjust their respective clocks. Method 600 provides a dynamic-clock network element receiving data packets carrying the encoded media for a real-time media communication session from a static-clock network element (601). The frequency in which the packets are received is directly related to the speed of the clock of the static-clock network element. Thus, method 600 further provides the dynamic-clock network element calculating the average frequency at which the data packets are received from the static-clock network element (602). An average frequency is used so that the frequency is determined over a large enough period of time to avoid anomalies (e.g. network routing issues) that may affect the frequency determination on smaller sample sizes.

Since all of the clocks used by codecs at each respective network element to encode/decode media are supposed to be operating at the same speed, the dynamic-clock network element knows at what frequency it should expect to receive the packets in accordance with the dynamic-clock network element's own clock. The dynamic-clock network element is therefore able to determine whether a difference exists between the expected frequency of the received packets based on the dynamic-clock network element's own clock and the average frequency at which the packets are actually received (603).

When the average frequency of the received packets is lower than the frequency indicated by the dynamic-clock network element's clock, method 600 provides dynamic-clock network element increasing its clock speed an amount necessary to account for the difference in frequency (604). Alternatively, when the average frequency of the received packets is higher than the frequency indicated by the dynamic-clock network element's clock, method 600 provides dynamic-clock network element decreasing its clock speed an amount necessary to account for the difference in frequency (604). Of course, if no difference is determined, then no adjustment is made.

In any of the embodiments described above, the dynamic-clock network elements may adjust their clocks multiple times during the media communication session. For instance, a free-running clock may tend to drift overtime from the desired frequency and therefore may need to occasionally be adjusted back into line with the static-clock network element. Additionally, the accuracy of the network elements may change throughout the communication session. For example, a free-running clock may synchronize with a stratum clock server at some point in the middle of the communication session or a stratum synchronized clock may lose contact with the stratum clock server. Alternatively, new network elements may join the communication session and other network elements may drop from the communication session. Regardless, the embodiments above may repeat the process of selecting a static-clock network element during the course of the communication session to ensure an optimal static and dynamic clock arrangement continues as conditions change during the communication session.

Figure 7:
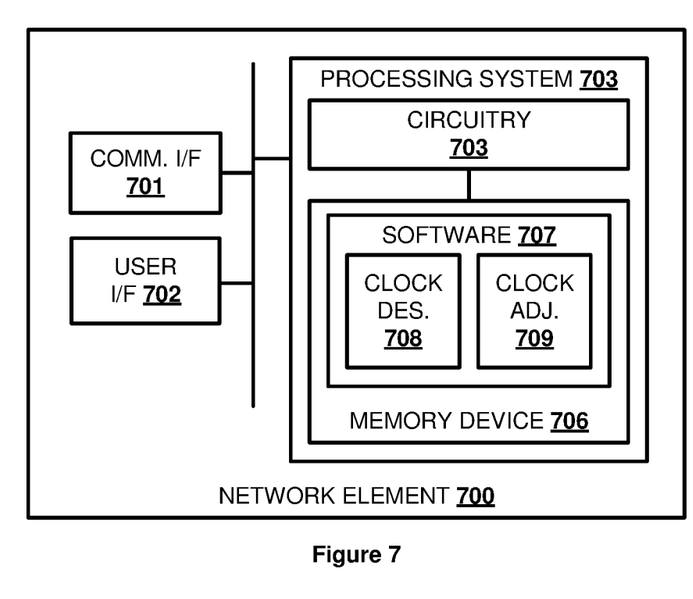
FIG. 7 illustrates a computing architecture for implementing a network element to synchronize a media codec between network elements of a media communication session.

FIG. 7 illustrates network element 700. Network element 700 is an example of network elements 101 and 102, although elements 101 and 102 may use alternative configurations. Network element 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes clock designation module 708 and clock adjustment module 709. Operating software 707 may further include an operating system, utilities, drivers, network interfaces, applications, or some other type of software. When executed by circuitry 705, operating software 707 directs processing system 703 to operate network element 700 as described herein.

In particular, clock designation module 708 directs processing system 703 to designate a first network element to be a static-clock network element during the media communication session and designate at least a second network element to be a dynamic-clock network element during the media communication session. Clock adjustment module 709 directs processing system 703 to determine that a difference in clock speed exists between a second clock speed for the media codec at the second network element and a first clock speed for the media codec at the first network element. Also, clock adjustment module 709 directs processing system 703 to adjust the second clock speed to account for the difference in clock speed.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for synchronizing a media codec between network elements of a media communication session, the method comprising:
    after initiation of the media communication session between a first network element and at least a second network element:
        determining that a first clock speed for the media codec at the first network element comprises a most accurate clock speed relative to clock speeds of other network elements on the media communication session;
        designating the first network element to be a static-clock network element during the media communication session and designating at least the second network element to be a dynamic-clock network element during the media communication session, wherein real-time user communications are exchanged between the first network element and at least the second network element during the media communication session, and wherein the real-time user communications comprise media encoded using the media codec;
        determining that a difference in clock speed exists between a second clock speed for the media codec at the second network element and the first clock speed; and
        adjusting the second clock speed to account for the difference in clock speed;
    at a time after designating the first network element to be the static-clock network element:
        determining that the first clock speed no longer comprises the most accurate clock speed;
        designating the first network element as a dynamic-clock network element; and
        designating another network element now having the most accurate clock speed to be the static-clock network element.

2. The method of claim 1, wherein determining that the difference in clock speed exists comprises:
    at the second network element, receiving a plurality of data packets for the media communication session from the first network element;
    calculating an average frequency in which the plurality of data packets is received; and
    determining that a difference in frequency exists between the average frequency and a frequency of the first clock speed.

3. The method of claim 2, wherein calculating the average frequency comprises:
    using the second clock speed to maintain a counter to calculate an arrival rate of the plurality of data packets.

4. The method of claim 2, wherein adjusting the second first clock speed comprises:
    increasing the second clock speed when the average frequency is determined to be lower than the frequency of the first clock speed; and
    decreasing the second clock speed when the average frequency is determined to be higher than the frequency of the first clock speed.

5. The method of claim 2, wherein the plurality of data packets is received in the Real-time Transport Protocol (RTP).

6. The method of claim 1, wherein the first network element comprises a first endpoint to the media communication session that is operated by a first user, the second network element comprises a second endpoint to the media communication session that is operated by a second user, and the media communication session is initiated by a conference system that provides real-time media communication services to the first network element and at least the second network element.

7. The method of claim 1, further comprising:
    at the second network element, receiving a clock speed indication from the first network element indicating the first clock speed.

8. The method of claim 1, wherein the first clock speed comprises a default clock speed for the media codec.

9. A network element to synchronize a media codec between network elements of a media communication session, the network element comprising:
    one or more computer readable storage media;
    a processing system operatively coupled with the one or more computer readable storage media; and
    program instructions stored on the one or more computer readable storage media that, when read and executed by the processing system, direct the processing system to:
        after initiation of the media communication session between a first network element and at least a second network element:

determine that a first clock speed for the media codec at the first network element comprises a most accurate clock speed relative to clock speeds of other network elements on the media communication session;

designate the first network element to be a static-clock network element during the media communication session and designate at least the second network element to be a dynamic-clock network element during the media communication session, wherein real-time user communications are exchanged between the first network element and at least the second network element during the media communication session, wherein the real-time user communications comprise media encoded using the media codec;

determine that a difference in clock speed exists between a second clock speed for the media codec at the second network element and the first clock speed; and adjust the second clock speed to account for the difference in clock speed;

at a time after designating the first network element to be the static-clock network element:

determine that the first clock speed no longer comprises the most accurate clock speed;

designate the first network element as a dynamic-clock network element; and designate another network element now having the most accurate clock speed to be the static-clock network element.

10. The network element of claim 9, wherein the first network element comprises a first endpoint to the media communication session that is operated by a first user, the second network element comprises a second endpoint to the media communication session that is operated by a second user, and the media communication session is initiated by a conference system that provides real-time media communication services to the first network element and at least the second network element.

11. The network element of claim 9, wherein the program instructions further direct the processing system to:

provide the second network element with a clock speed indication from the first network element indicating the first clock speed.

12. A network element to synchronize a media codec between network elements of a media communication session, the network element comprising:

one or more computer readable storage media;

a processing system operatively coupled with the one or more computer readable storage media; and program instructions stored on the one or more computer readable storage media that, when read and executed by the processing system, direct the processing system to:

after initiation of the media communication session between a first network element and at least the network element:

designate the network element to be a dynamic-clock network element during the media communication session, wherein a first clock speed for the media codec at the first network element is determined to comprise a most accurate clock speed relative to clock speeds of other network elements on the media communication session, wherein the first network element is designated to be a static-clock network element during the media communication session, wherein real-time user communications are exchanged between the first network element and at least the network element during the media communication session, and wherein the real-time user communications comprise media encoded using the media codec;

determine that a difference in clock speed exists between a second clock speed for the media codec at the network element and the first clock speed; and adjust the second clock speed to account for the difference in clock speed;

wherein at a time after designating the first network element to be the static-clock network element, the first clock speed is determined to no longer comprise the most accurate clock speed, first network element is designated as a dynamic-clock network element, and another network element now having the most accurate clock speed is designated to be the static-clock network element.

13. The network element of claim 12, wherein to determine that the difference in clock speed exists, the program instructions direct the processing system to:

receive a plurality of data packets for the media communication session from the first network element;

calculate an average frequency in which the plurality of data packets is received; and determine that a difference in frequency exists between the average frequency and a frequency of the first clock speed.

14. The network element of claim 13, wherein to calculate the average frequency, the program instructions direct the processing system to:

use the second clock speed to maintain a counter to calculate an arrival rate of the plurality of data packets.

15. The network element of claim 13, wherein to adjust the second clock speed, the program instructions direct the processing system to:

increase the second clock speed when the average frequency is determined to be lower than the frequency of the first clock speed; and decrease the second clock speed when the average frequency is determined to be higher than the frequency of the first clock speed.

16. The network element of claim 13, wherein the plurality of data packets is received in the Real-time Transport Protocol (RTP).

* * * * *